US007979705B2

(12) United States Patent
Schaeck et al.

(10) Patent No.: US 7,979,705 B2
(45) Date of Patent: Jul. 12, 2011

(54) CONDITIONAL SUPPRESSION OF CARD HOLDER VERIFICATION

(75) Inventors: Thomas Schaeck, Achern (DE); Michael Wasmund, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 1923 days.

(21) Appl. No.: 09/731,509

(22) Filed: Dec. 7, 2000

(65) Prior Publication Data

US 2001/0003842 A1 Jun. 14, 2001

(30) Foreign Application Priority Data

Dec. 11, 1999 (EP) .................................... 99124724

(51) Int. Cl.
*H04L 9/32* (2006.01)

(52) U.S. Cl. .......... 713/169; 713/184; 713/185; 726/20; 235/379; 235/380

(58) Field of Classification Search .................. 235/382, 235/492, 379, 380, 381; 713/169, 185, 172, 713/184, 200, 201; 726/20
See application file for complete search history.

(56) References Cited

U.S. PATENT DOCUMENTS

| | | | | |
|---|---|---|---|---|
| 3,866,173 A | * | 2/1975 | Moorman et al. | 340/5.54 |
| 4,187,498 A | * | 2/1980 | Creekmore | 340/5.8 |
| 4,614,861 A | * | 9/1986 | Pavlov et al. | 235/380 |
| 4,629,872 A | * | 12/1986 | Hallberg | 235/380 |
| 4,700,055 A | * | 10/1987 | Kashkashian, Jr. | 235/379 |
| 4,752,678 A | * | 6/1988 | Rikuna | 235/380 |
| 4,802,218 A | * | 1/1989 | Wright et al. | 705/60 |
| 4,810,862 A | * | 3/1989 | Nakano et al. | 235/380 |
| 4,900,904 A | * | 2/1990 | Wright et al. | 235/381 |
| 5,006,698 A | * | 4/1991 | Barakat | 235/382 |
| 5,012,074 A | * | 4/1991 | Masada | 235/379 |
| 5,113,499 A | * | 5/1992 | Ankney et al. | 340/5.74 |
| 5,130,519 A | * | 7/1992 | Bush et al. | 235/380 |
| 5,228,084 A | * | 7/1993 | Johnson et al. | 705/71 |
| 5,446,266 A | * | 8/1995 | Beuk et al. | 235/382.5 |
| 5,585,787 A | * | 12/1996 | Wallerstein | 340/5.42 |
| 5,719,950 A |   | 2/1998 | Osten et al. | 382/115 |
| 5,883,452 A | * | 3/1999 | Masuda | 235/380 |
| 5,917,168 A | * | 6/1999 | Nakamura et al. | 235/379 |
| 5,979,773 A | * | 11/1999 | Findley et al. | 235/492 |
| 6,011,858 A | * | 1/2000 | Stock et al. | 382/115 |
| 6,111,951 A | * | 8/2000 | Guenther | 235/375 |
| 6,157,721 A | * | 12/2000 | Shear et al. | 380/255 |
| 6,179,205 B1 | * | 1/2001 | Sloan | 235/382 |

(Continued)

FOREIGN PATENT DOCUMENTS

DE 198 13 206 A1 9/1999
JP 2000276542 A * 10/2000

*Primary Examiner* — Carl Colin
(74) *Attorney, Agent, or Firm* — William A. Kinnaman, Esq.; Heslin Rothenberg Farley & Mesiti P.C.

(57) ABSTRACT

The present invention relates to a method and system for comfortably operating chipcard applications in a chipcard application system. It is proposed to define at least one trusted terminal device (12) in a trusted environment for a Chipcard (10) in use with which the card holder verification (CHV) dialogue is suppressed and the CHV operation is performed in the system hidden from the user. Either, the trusted terminal ID is stored on the chip of the chipcard, or, the Chipcard ID (22) is stored on a trusted terminal together with the PIN (Personal Identification Number) of the card holder. Such an association can help to suppress the CHV dialogue in a trusted environment.

17 Claims, 4 Drawing Sheets

U.S. PATENT DOCUMENTS

| | | | |
|---|---|---|---|
| 6,185,316 B1 * | 2/2001 | Buffam | 382/115 |
| 6,213,391 B1 * | 4/2001 | Lewis | 235/380 |
| 6,259,956 B1 * | 7/2001 | Myers et al. | 700/80 |
| 6,298,441 B1 * | 10/2001 | Handelman et al. | 713/185 |
| 6,339,828 B1 * | 1/2002 | Grawrock et al. | 713/183 |
| 6,473,500 B1 * | 10/2002 | Risafi et al. | 379/144.01 |

* cited by examiner

CONDITIONAL SUPPRESSION OF CARD HOLDER VERIFICATION

PRIOR FOREIGN APPLICATION

This application claims priority from European patent application number 99124724.8, filed Dec. 11, 1999, which is hereby incorporated herein by reference in its entirety.

TECHNICAL FIELD

The present invention relates to controlled use of devices the operation of which is controlled by an electronic circuit. In particular, person-related security mechanisms working with any personal token are concerned. Even more particularly, the present invention relates to method and system for comfortably operating chipcard applications in a chipcard application system in which said chipcard and said terminal are provided with card holder verification means comprising a personal identification number, further referred and abbreviated herein as PIN, a chipcard ID and a terminal ID.

BACKGROUND ART

Personal tokens, as are for example SmartCards or Chipcards are used in a large variety of applications. Often, a Chipcard holder can use his personal chipcard in a plurality of host terminal devices in order to run one or more desired applications. In a program-driven interaction with the host site application program the desired application starts running after a so-called card holder verification—further referred to herein and abbreviated as CHV—has taken place.

A card holder is usually verified in prior art by prompting him for entry of his PIN which is a secret code shared between the chipcard memory and the chipcard holder only, e.g., 4 digits long. If the entered PIN is the same as that one stored in the memory of the chipcard the card holder is verified succesfully.

After said verification some data stored on the Chipcard and protected by said verification mechanism can be accessed by the program stored on the card or by the host application program the card is connected with.

In prior art systems depending of the application CHV can be temporarily suppressed by the authorized user whereby the use of the Chipcard is free from CHV. Then, however, the card and the data stored on it can be freely used by any person who possesses the card. Thus, there is always a static association between the data objects to be accessed on the card and CHV.

On the one hand any unprotected Chipcard can easily be misused by any third person possessing the card, e.g. in case of theft. Thus, CHV is very useful.

On the other hand CHV is inconvenient, however, especially in those cases in which a terminal device is used which is located in a trusted environment such as the card holders home. Here, the Chipcard user is always bothered with repetitive CHV.

SUMMARY OF THE INVENTION

It is thus the object of the present invention to provide a method and system for operating Chipcard applications in which the above mentioned security mechanism is adaptable automatically to the environment in which the Chipcard is actually used.

This object of the invention is achieved by the features stated in enclosed independent claims. Further advantageous arrangements and embodiments of the invention are set forth in the respective subclaims.

According to the basic principles of the present invention it is proposed to define at least one terminal device in a trusted environment for a Chipcard in use with which a CHV dialogue is suppressed and CHV is performed in the system hidden from the user. Alternatively, CHV can be suppressed even internal in the system. According to the present invention this can be achieved in basically two different ways.

First, the Chipcard is associated with the users terminal in a trusted enviroment (the home-terminal) with a unique ID of said terminal. This step is referred to further herein as association between chipcard and terminal. When the Chipcard is inserted later into an arbitrary different terminal the chipcard application obtains the terminal-ID from the terminal and compares it with its own terminal-ID stored in the chipcard. If both match, the terminal is considered to be trusted and does not ask the user for entering its PIN, but feeds that information to the Chipcard on behalf of the user and hidden to him.

Second, the Chipcard is associated with the home terminal whereby the unique ID of the chipcard is stored in the terminal. When the Chipcard is inserted into an arbitrary terminal, the terminal reads the Chipcard's ID and compares it with the one stored in the terminal. If the ID is known to the terminal it does not ask the user for entering his PIN but feeds that information to the Chipcard on behalf of the user.

According to an advantageous aspect of the present invention it is proposed to provide the terminal device with a storage unit, e.g., a vector or array which is able to store a plurality of pairs of Chipcard-IDs and PINs. This allows for associating a plurality of users each having a Chipcard when they want to share a common trusted terminal device.

Furthermore, according to a further, advantageous aspect of the present invention the Chipcard can be provided with a storage unit, e.g., a vector in which a plurality of terminal IDs can be stored. By that, it is possible to use a plurality of trusted terminal devices with one and the same Chipcard. This scenario is in particular advantageous when multi-purpose, i.e., multi-application Chipcards are used and thus different terminals can be used for the different applications stored in the Chipcard.

According to a further aspect of the present invention it is proposed to provide for erasable and renewable associations between Chipcard ID and PIN. The terminal device deletes an association between Chipcard-ID and PIN and checks the PIN again when the Chipcard put out an error code after having received a PIN which was stored in conjunction with a particular Chipcard-ID, i.e., when the PIN is not the same as stored in the vector on the terminal device. This feature can be relevant when the PIN of the Chipcard had been changed in a dialogue with a different terminal device. By that feature it can be avoided that a Chipcard is blocked by repeated insertion into a terminal device and resulting transmission of the wrong PIN to the terminal device. Furthermore, a user can create a new PIN in cooperation with the trusted terminal device in a case in which he had forgotten the former PIN.

Advantageously, only pairs of IDs are stored in said chipcard vector or said terminal side vector instead of allowing a PIN to be stored without an associated device ID of either chipcard or terminal. This facilitates the control flow of the proposed method.

Further, it can be advantageous to control the initial association between terminal ID and Chipcard ID by controlling means which are provided via a network to which the terminal is connectable. Thus, the card issuer has the power to exclude some combinations of terminals and chipcards—e.g., in cases of compromised security.

BRIEF DESCRIPTION OF THE DRAWINGS

The present invention is illustrated by way of example and is not limited by the shape of the figures of the accompanying drawings in which.

BEST MODE FOR CARRYING OUT THE INVENTION

Figure 1:
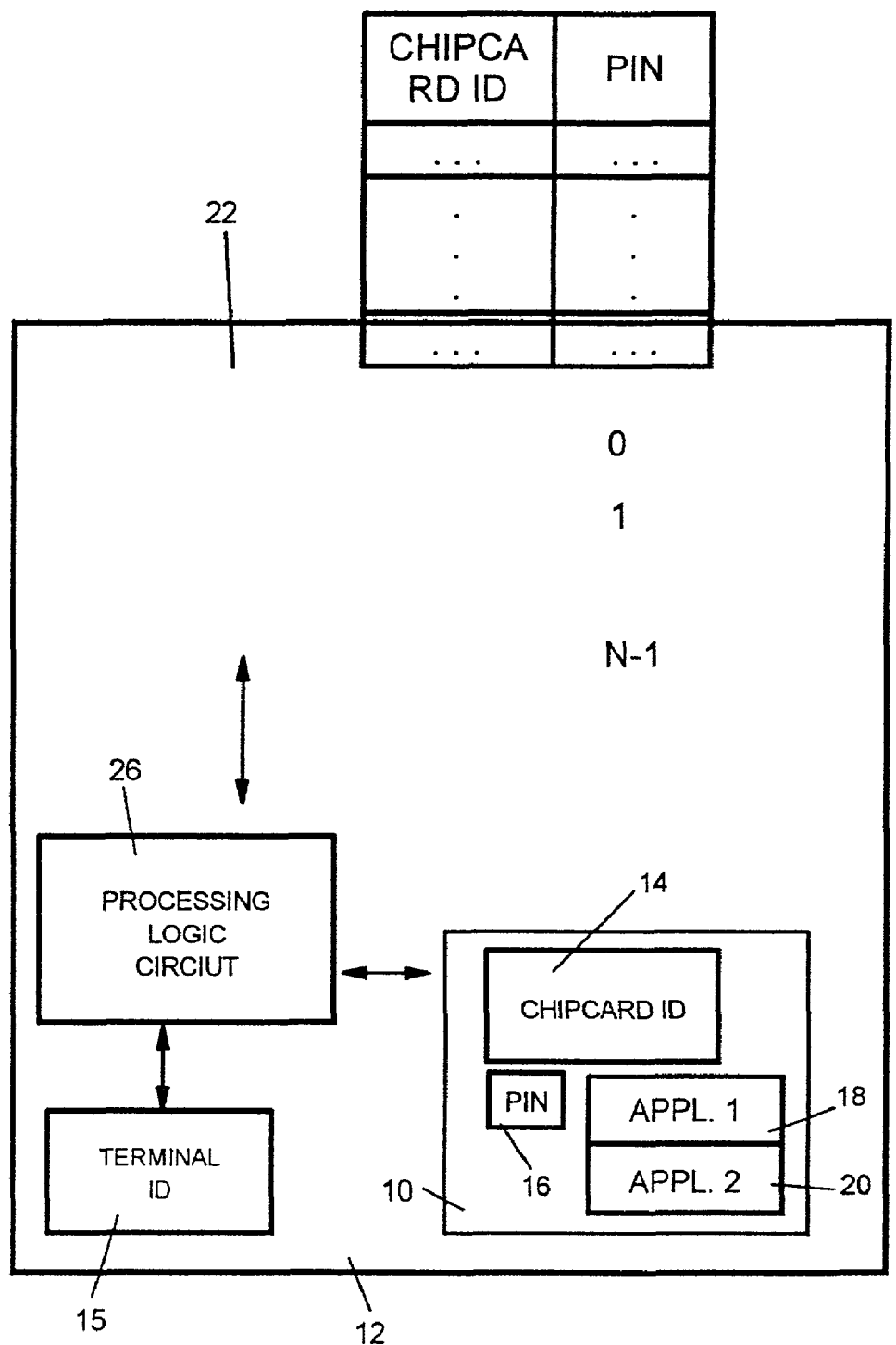
FIG. 1 is a schematic representation of a Chipcard application system showing the essential data objects and entities involved in the inventional method.

With general reference to the figures and with special reference now to FIG. 1, the storage structures involved in the inventional method are described next below.

A Chipcard 10 is depicted to be inserted in a terminal device 12. In this exemplary embodiment the terminal device is a screen phone, i.e., a phone device with an additional feature of displaying and entering data for access to the Internet. The special kind of application, however, is not of primary interest for the disclosure of the present invention.

In the Chipcard there is provided a storage field 14 which stores the Chipcard-ID. A further field stores the PIN. As the Chipcard depicted in FIG. 1 is a multi-application Chipcard a plurality of two storage areas 18, 20 are depicted for storing applications 1 and 2.

The screen phone 12 comprises a storage area 22 which is organized as an array—or vector in order to store N pairs of values of Chipcard-ID and associated PIN. Each pair is depicted in one row of the vector. Further, a storage field 15 is provided which holds the unique Terminal ID. A processing logic circuit 26 is depicted schematically for accessing all storage fields and for providing the interaction between screen phone 12 and Chipcard 10 required to run a particular Chipcard application.

In the case depicted in FIG. 1 application 1 stored in the field 18 is chosen to form part of said screen phone Chipcard application.

The inventional method of operating said Chipcard application will be described in more detail with reference to the second alternative mentioned above and with reference to FIG. 2. Prior to entering into the steps depicted there the Chipcard 10 which belongs to a particular user X, i.e., the Chipcard holder, has to be initialized in the sense of the present invention. This means the Chipcard has to be associated with at least one preferred terminal which is the so called trusted terminal. This terminal is a terminal which is located in a secure environment, secure in a sense that a misuse of the Chipcard during a Chipcard application needs not be considered as realistic. Such environment can be the home environment of the user X, for example.

Figure 4:
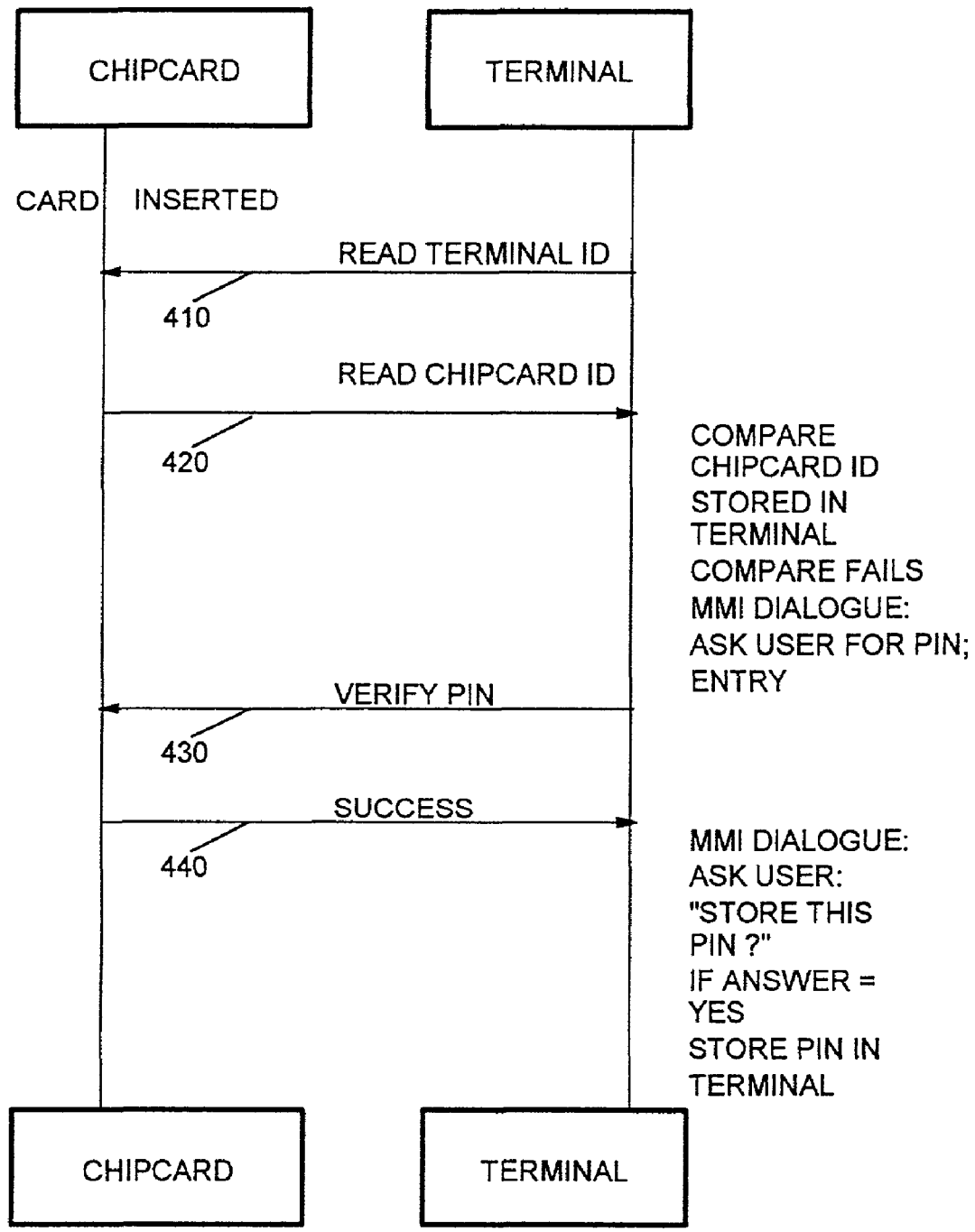
FIG. 4 is a schematic representation of a dialogue between terminal and chipcard during the initial association between Chipcard ID and terminal ID.

The basic steps and information exchange required for said initial association is schematically depicted in FIG. 4. Where is referenced to MMI this means man-machine-interface.

The Chipcard is first inserted into the terminal. Then, the application program stored in the terminal is launched and the terminal ID is transferred from the terminal into the Chipcard, step 410. In case the Chipcard is not compatible with the terminal which can be seen from the terminal ID—the Chipcard can be rejected and a further processing can be terminated.

Then in a next step 420, when the Chipcard was accepted by the terminal the Chipcard-ID 14 is read from the Chipcard into the terminal-side processor 20. As was already described with reference to FIG. 1 the terminal stores a plurality of Chipcard-IDs with respective PINs which are accepted for the comfortable Chipcard utilization intended by the present invention.

The Chipcard-ID actually read from the Chipcard is now compared with the Chipcard-IDs stored in the storage vector 22 of the terminal. As, originally, this vector is empty, or, at least the vector is not filled with the particular Chipcard-ID of the user X the compare fails and the user is asked for entering his PIN. After prior art repeated entry and verification—steps 430, 440—the user is prompted by the terminal program if he wishes to store the PIN along with the Chipcard-ID in the screen phone. Then the user enters his PIN, and after verification the pair consisting of user X's Chipcard-ID and user X's PIN is stored in a location not yet used in the storage vector 22 of the terminal device. Thus, the initial association between Chipcard-ID and terminal-ID has completed.

With reference back to FIG. 2 and describing now the inventional convenient way of operation as intended by the invention the same user X wants to start the Chipcard application, inserts his Chipcard into the screen phone and the Chipcard-ID together with an optional Chipcard user information, i.e., the name of the user, is read from the Chipcard to the terminal processor, step 210.

In a next step 220 said Chipcard-ID is compared to the Chipcard-IDs stored in the vector 22. If the Chipcard-ID is found stored together with a PIN said stored PIN is sent from the terminal to the Chipcard, step 230. The Chipcard processor checks if said PIN is OK or not. In case it is OK the user can utilize its Chipcard without having to enter his PIN, step 240 as it was intended by the inventional method.

In the case in which the Chipcard-side check of the PIN yields that the PIN is not correct and in the case in which in the earlier step 220 the matching chipcard ID and PIN pair was not found the user is asked to input his PIN, step 250. Then, the user inputs his PIN and the terminal sends the PIN back to the Chipcard, step 260.

The Chipcard processor compares the freshly entered PIN with the PIN stored in the PIN field 16 depicted in FIG. 1. If they are not identical the user is prompted for repeating the input. This loop is limited for e.g., three retries.

If the entered PIN is identical with the PIN stored in the chipcard the user is asked if he wishes to store the PIN in the terminal in order associate terminal and card for later convenient use, step 270. See also FIG. 4. If he wishes so, the pair comprising Chipcard-ID and PIN is stored in the vector 22 in a free location, step 280.

If the user does not wish to store the PIN in the vector the above step 280 is omitted and the Chipcard can be utilized for the desired Chipcard application by the user.

As reveals from the drawing the short and comfortable way to suppress the card holder verification dialogue is depicted on the left side of the diagram. The way is straight from top to down performing steps 210, 220, 230 and 240 sequentially. The user X needs not enter his PIN as he has chosen the trusted terminal for running his particular Chipcard application.

If the same user X would have chosen a different terminal located in a location which is for example accessible by the public and does not considered as trusted the search and compare step 220 would yield that the PIN is not stored in the vector. Thus, the user would be obliged to enter his PIN.

With special reference now to FIG. 3 a further advantageous aspect of the present invention will be described in more detail by which the user is enabled to delete an existing association between a Chipcard-ID and a PIN and to replace it by a new association. As will be seen from the detailed description next below this procedure even works when the user has forgotten his old PIN because he can take profit from the fact, that the PIN is not required for input at his trusted terminal.

In a first step 305 the user X inserts his Chipcard into the Chipcard reader of the terminal device whereby the Chipcard-ID is read by the terminal application processor.

Additionally and optionally an additional user information like the name of the user is read from the card as well in order to display the user's name instead of the chipcard ID to the User.

In a next step 310 the Chipcard-ID is searched in the vector 22 as described before with reference to FIG. 2. In case the Chipcard-ID is found stored with an associated PIN a dialogue is started during which the user is enabled to enter the new PIN, step 315. The new and the old PIN are then sent from the terminal processor to the Chipcard in order to compare the old PIN with the value stored on the Chipcard, step 320.

In case the old PIN was identical with the value stored on the Chipcard the associated pair of Chipcard-ID and PIN is overwritten with the new PIN in the vector 22, step 325. Then, the PIN change procedure has completed.

In case in which the old PIN was not identical to the PIN stored on the Chipcard a dialogue is started in which the user is enabled to input the old PIN followed by the new PIN, step 330.

Then, in step 335 the PIN changing commands comprising old PIN and new PIN is sent to the Chipcard where the old PIN is checked for identity as described above.

In case the chipcard accepted the PIN update the user is prompted to accept a storage of the new PIN together with the Chipcard-ID, step 340. In case the storage is desired the Chipcard-ID is stored together with the new PIN in the vector 22, step 345, whereas the procedure completes without such storage if it is not desired.

In case that the check for identity of the old PIN which was performed following the step 335 described above yields that the old PIN is not identical to the new PIN a storage of the new PIN can not be offered to the user.

Instead, the user is prompted again for entering the old PIN followed by the new PIN as described with reference to step 330. The control is then continued as described above for a limited number of retries.

Figure 2:
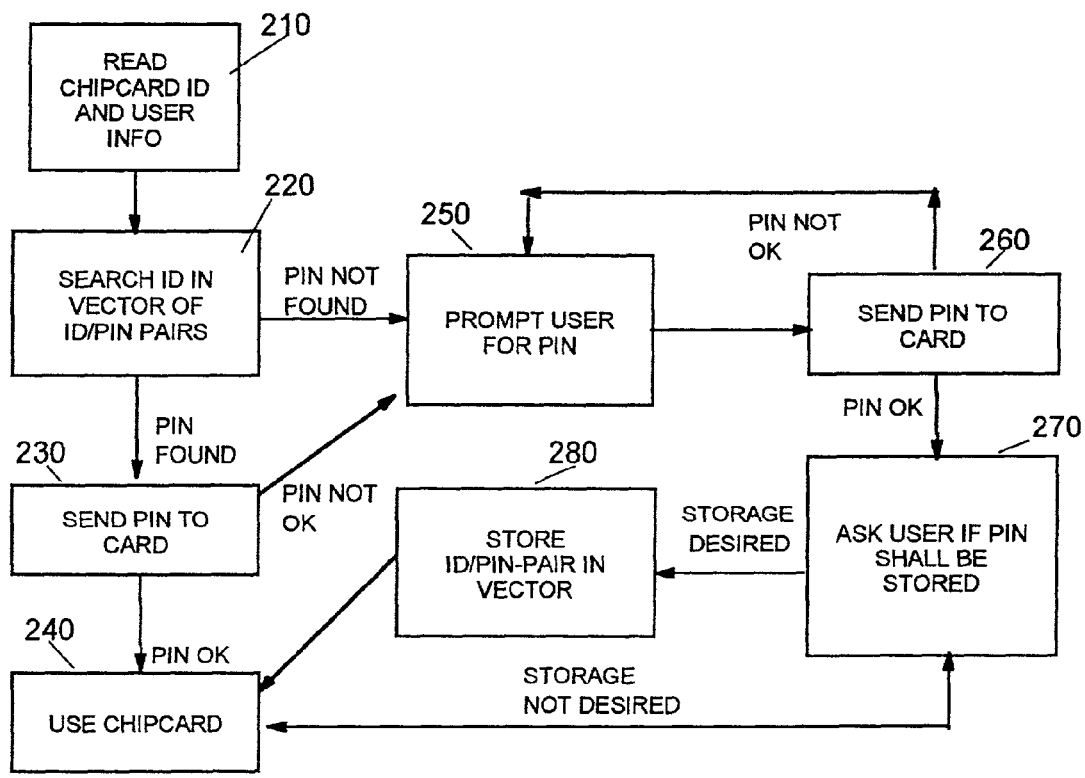
FIG. 2 is a schematic representation showing steps in the control flow during the inventional method of CHV dialogue suppression according its basic concepts.

If in step 310 Chipcard-ID is found within the sequence of pairs the user can advantageously be enabled to use the same procedure for the purpose of creating a new pair of Chipcard-ID/PIN in the vector 22 as in FIG. 2. This step, however is optional in this context.

It should be noted, that normally, in step 315 it is not required to let the user enter the old PIN when he uses the trusted terminal for the described procedure. Otherwise, in case of a not-trusted terminal the user will be obliged to enter both, old PIN and new PIN.

This inventional feature can advantageously be performed by a user in regular intervals of time for purposes of security, or, in the special case in which there is any suspect that his PIN has become available for third persons.

The above described configuration can obviously be modified in order to comprise further additional and different features. For example a similar mechanism as described above can be performed with the device-ID of the terminal being stored on the Chipcard instead of storing the Chipcard-ID in the terminal.

Figure 3:
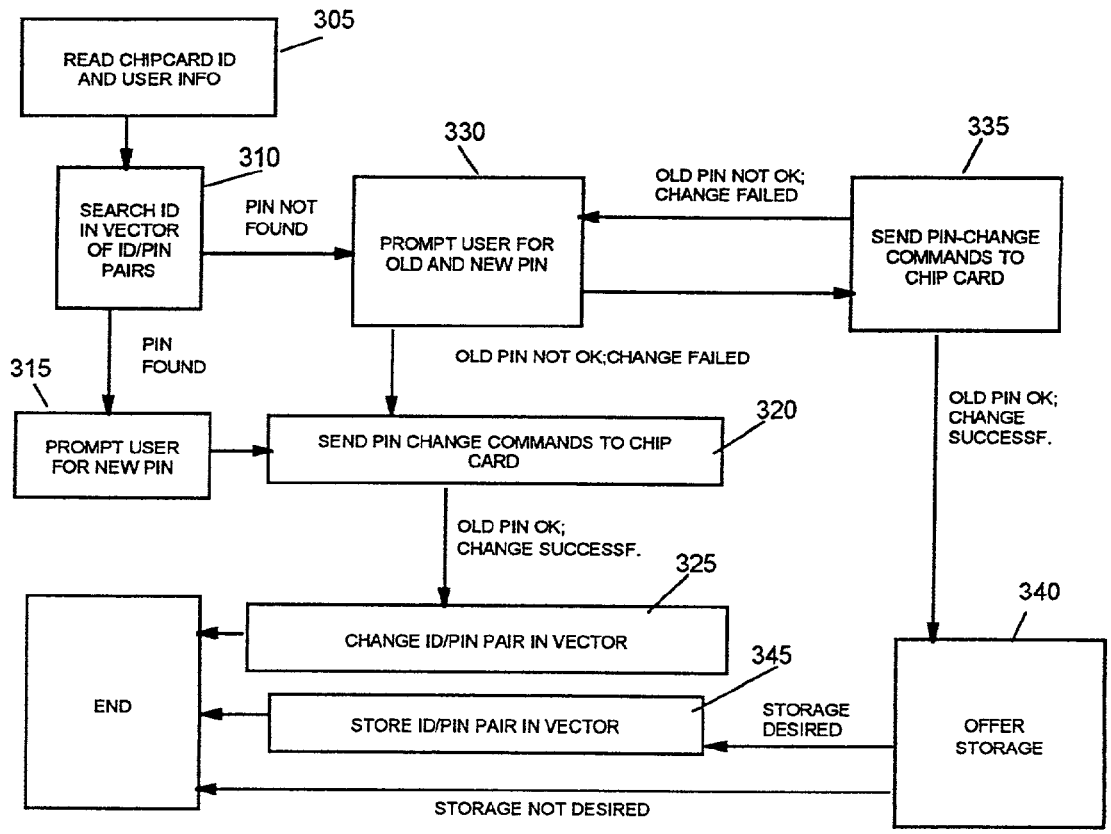
FIG. 3 is a schematic representation showing steps in the control flow during the inventional method according to an additional advantageous aspect of the present invention, namely the ability to re-associate a chipcard with a terminal.

The question where to locate the program logic circuit performing the steps described in FIGS. 2 and 3 depends basically on the Chipcard application in use. Normally, said logic will be located on the terminal side as the terminal dominates the Chipcard, generally. There are, however, exceptional cases of Chipcard application as, for example, the chipcard placed in a mobile phone—the so-called SIM, i.e., Subscriber Identity Module—in which the program logic located on the Chipcard, i.e., the SIM can have some particular advantages. In these cases the terminal device, e.g., the mobile phone is polling the SIM-card in order to establish and maintain the above described steps correspondingly.

When the logic is implemented on the SIM chip and in the mobile phone, the phone is configurable such that it can only be used with the particular SIM-card of user X. In order to achieve this it would be required to initialize the mobile phone with a dialogue during which the SIM-card-ID is made known to the mobile phone processor which has the function of the terminal processor as described above—and to store the SIM-card-ID in some storage area of the mobile phone processor. Thus, this feature helps to make theft of mobile phones become unattractive, because the mobile phone cannot be operated with another person's SIM card.

As should reveal from the above description the inventional features are very simply to be implemented.

The above described suppression method can be advantageously applied in different environments, too. For example in any environment the access of which is controlled in a different manner, e.g. by a security mechanism connected with the doors of the room in which the terminal device in question is located.

In the foregoing specification the invention has been described with reference to a specific exemplary embodiment thereof. It will, however, be evident that various modifications and changes may be made thereto without departing from the broader spirit and scope of the invention as set forth in the appended claims. The specification and drawings are accordingly to be regarded as illustrative rather than in a restrictive sense.

The present invention can be realized in hardware, software, or a combination of hardware and software. Any kind of computer system or other apparatus adapted for carrying out the methods described herein is suited. A typical combination of hardware and software could be a terminal computer system with a computer program that, when being loaded and executed, controls the computer system such that it carries out the methods described herein. The same applies for e.g. JAVA applets stored on a chipcard.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;

b) reproduction in a different material form.

What is claimed is:

1. A method of controlling card holder verification, said method comprising:

checking the presence of a trusted association between at least one device and a card usable with the at least one device, wherein the checking comprises comparing by one of the card and the at least one device a first identifier stored on the card with one or more identifiers stored in the at least one device; and if the checking indicates the presence of the trusted association, then performing card holder verification separate from the comparing using the card and without a holder of the card providing information by providing another identifier to the card from the at least one device for comparing by the card to a second identifier stored on the card that is different from the first identifier, otherwise, if the checking indicates no trusted association, then involving the holder of the card in performing card holder verification by the card.

2. The method of claim 1, wherein the at least one device is located in a trusted environment.

3. The method of claim 1, wherein the card comprises a chipcard.

4. The method of claim 1, wherein the performing card holder verification without a holder of the card providing information comprises performing card holder verification hidden from the holder of the card.

5. The method of claim 4, wherein the performing card holder verification hidden from the holder of the card comprises automatically obtaining a personal identification number of the holder of the card and verifying the personal identification number without the holder of the card providing the personal identification number.

6. The method of claim 1, wherein the comparing comprises comparing a card identifier stored on the card with one or more card identifiers stored in the device.

7. The method of claim 6, wherein the card identifier is associated with a personal identification number usable in card holder verification, and said method further comprises replacing the personal identification number with another personal identification number.

8. The method of claim 6, wherein the card identifier is associated with a personal identification number usable in card holder verification, and said method further comprises erasing the association between the card identifier and the personal identification number.

9. The method of claim 1, wherein the comparing comprises comparing an identifier of the device with one or more device identifiers stored on the card.

10. The method of claim 9, wherein the device identifier is associated with a personal identification number usable in card holder verification, and said method further comprises replacing the personal identification number with another personal identification number.

11. The method of claim 9, wherein the device identifier is associated with a personal identification number usable in card holder verification, and said method further comprises erasing the association between the device identifier and the personal identification number.

12. The method of claim 1, wherein the performing card holder verification without a holder of the card providing information comprises automatically obtaining a personal identification number of the holder of the card and verifying the personal identification number without requesting information from the holder of the card, and wherein the involving the holder of the card comprises requesting the holder of the card to enter the personal identification number.

13. The method of claim 1, further comprising associating the at least one device and the card.

14. The method of claim 13, further comprising controlling the association between a device of the at least one device and the card.

15. The method of claim 14, wherein the controlling comprises using a network connectable to the device.

16. The method of claim 1, wherein the checking is between at least one device and a plurality of cards, and wherein the performing card holder verification without a holder of the card providing information is for a plurality of holders.

17. A method of performing card holder verification, said method comprising:

checking the presence of a trusted association between at least one device and a card usable with the at least one device, wherein the checking comprises comparing by one of the card and the at least one device a first identifier stored on the card with one or more identifiers stored in the at least one device; and performing card holder verification by the card separate from and based on the checking, wherein:

if the checking indicates the presence of the trusted association, then a personal identification number of the holder of the card different from the first identifier is automatically provided to the card from the at least one device, and verified using the card without the holder of the card providing information;

however, if the checking indicates no trusted association, then the holder of the card is requested to enter the personal identification number to verify the holder of the card via the card comparing the personal identification number entered to a second identifier stored on the card.

* * * * *